(12) United States Patent
Setiabudi

(10) Patent No.: US 8,003,750 B2
(45) Date of Patent: Aug. 23, 2011

(54) THERMOSETTING COMPOSITION

(75) Inventor: Frans Setiabudi, Eschbach (DE)

(73) Assignee: Huntsman International LLC, The Woodlands, TX (US)

( * ) Notice: Subject to any disclaimer, the term of this patent is extended or adjusted under 35 U.S.C. 154(b) by 70 days.

(21) Appl. No.: 12/525,921

(22) PCT Filed: Jan. 31, 2008

(86) PCT No.: PCT/EP2008/051178
§ 371 (c)(1),
(2), (4) Date: Aug. 5, 2009

(87) PCT Pub. No.: WO2008/095850
PCT Pub. Date: Aug. 14, 2008

(65) Prior Publication Data
US 2010/0029891 A1    Feb. 4, 2010

(30) Foreign Application Priority Data

Feb. 8, 2007 (EP) .................... 07101986
Feb. 8, 2007 (EP) .................... 07101988
Aug. 23, 2007 (EP) .................... 07114840

(51) Int. Cl.
*C08G 65/38* (2006.01)
*C08G 63/00* (2006.01)

(52) U.S. Cl. ............ 528/210; 156/182; 427/385.5; 427/389.9; 524/611; 528/172

(58) Field of Classification Search ............ 156/182; 427/385.5, 389.9; 524/611; 528/172
See application file for complete search history.

(56) References Cited

U.S. PATENT DOCUMENTS

| | | |
|---|---|---|
| 4,501,864 A | 2/1985 | Higginbottom |
| 4,507,428 A | 3/1985 | Higginbottom |
| 5,945,222 A | 8/1999 | Nagase et al. |
| 6,207,786 B1 | 3/2001 | Ishida et al. |
| 6,376,080 B1 | 4/2002 | Gallo |
| 2004/0076805 A1 | 4/2004 | Oohori et al. |
| 2006/0008632 A1 | 1/2006 | Oohori et al. |
| 2007/0191555 A1 | 8/2007 | Ishida et al. |
| 2010/0015343 A1* | 1/2010 | Setiabudi ............... 427/389.9 |

FOREIGN PATENT DOCUMENTS

| | | |
|---|---|---|
| EP | 0789056 | 8/1997 |
| EP | 1369456 | 12/2003 |
| JP | 2000327882 | 11/2000 |
| JP | 2003147165 | 5/2003 |
| WO | WO 00/27921 | 5/2000 |
| WO | WO 2005/100432 | 10/2005 |

* cited by examiner

*Primary Examiner* — Terressa M Boykin
(74) *Attorney, Agent, or Firm* — Robert Holthus

(57) ABSTRACT

A thermosetting composition comprising (a) 97.9 to 40 percent by weight of at least one bis(dihydrobenzoxazine) prepared by the reaction of an unsubstituted or substituted bisphenol with at least one unsubstituted position ortho to each hydroxyl group, formaldehyde and a primary amine; (b) 2 to 50 percent by weight of at least one organic polyamine; and (c) 0.1 to 10 percent by weight of at least one curing catalyst, selected from the group of carboxylic acids, sulfonic acids and phosphonic acids having at least two acid groups and no other reactive groups; wherein the percent by weight refer to the total amount of components (a), (b) and (c) in the composition, with the proviso that (a), (b) and (c) add up to 100 percent by weight; and (d) and optionally other components. Cured products of these compositions show valuable chemical, physical and mechanical properties.

21 Claims, No Drawings

THERMOSETTING COMPOSITION

CROSS REFERENCE TO RELATED APPLICATIONS

This application is the National Phase of International Application PCT/EP2008/051178 filed Jan. 31, 2008 which designated the U.S. and which claims priority to European Patent Application (EP) 07101986.3 filed Feb. 8, 2007, European Patent Application (EP) 07101988.9 filed Feb. 8, 2007, and European Patent Application (EP) 07114840.7 filed Aug. 23, 2007. The noted applications are incorporated herein by reference.

TECHNICAL FIELD

This invention relates to thermosetting composition comprising, (a) 97.9 to 40 percent by weight of at least one bis(dihydrobenzoxazine) prepared by the reaction of an unsubstituted or substituted bisphenol with at least one unsubstituted position ortho to each hydroxyl group, formaldehyde and a primary amine; (b) 2 to 50 percent by weight of at least one organic polyamine; and (c) 0.1 to 10 percent by weight of at least one curing catalyst, selected from the group of carboxylic acids, sulfonic acids and phosphonic acids having at least two acid groups and no other reactive groups. The invention also relates to the use of this composition for the manufacture of any materials with a cured resin of this thermosetting composition.

BACKGROUND OF THE INVENTION

Benzoxazine compounds have been employed satisfactorily to produce prepregs, laminates, moulding material, RTM (resin transfer moulding) systems, sealants, sinter powders, cast articles, structural composites parts, varnishes, surface coatings, electrical and electronic components by impregnating, coating, laminating or moulding processes. Such resins are dimension stable and have good electrical and mechanical resistance, low shrinkage, low water absorption, medium to high glass transition temperatures and good retaining properties, in term of mechanical properties.

Benzoxazine compounds can easily be produced in several, well known ways by the reaction of bisphenols with a primary amine and formaldehyde, whereby the process can be carried out in the presence of solvents (see for example U.S. Pat. Nos. 5,152,993 or 5,266,695) or in the absence of solvents (see for example U.S. Pat. No. 5,543,516). The common manufacture and various curing possibilities using hardeners such as novolacs, polyepoxides or polyamines optionally together with catalysts, or the catalytical and/or thermal curing as well as the valuable properties of the resins make this class of thermosetting resins attractive.

EP 0 149 987 A2 describes a thermosetting resin composition with improved storage stability comprising dihydrobenzoxazines of polyphenols and a reactive polyamine or polyamine generating compound. The composition is used for the manufacture of moulded, encapsulated articles or laminates, or of coatings. The composition is conveniently used as solution in organic solvents for surface coating applications. The solution with poly(dihydrobenzoxazines) and polyamines is stabilized by formation of an organic acid salt of the polyamines, whereby acids are selected from preferably volatile aliphatic mono carboxylic acids. The only disclosed purpose of an organic acid addition is the stabilization of the solution at about room temperature.

SUMMARY OF THE INVENTION

It has now been surprisingly found that organic poly acids are excellent curing catalysts for the polymerization of bis (dihydrobenzoxazine) compounds and organic polyamines, providing improved reactivity and correspondingly lower gel times at high temperatures. It was also found that a composition comprising bis(dihydrobenzoxazine) compounds, organic polyamines and an organic poly acid catalyst such as alkylene dicarboxylic acids possess an unusual high latency and storage stability regarding the increased reactivity. The admixed components can be stored in one container and shipped to users, which is a significant economic advantage and much more comfortable for users. Additionally, the processability and control during moulding operations, such as pressing, is improved by the reduction of flow due to the higher reactivity, thus resulting in improved dimensional accuracy. The cured polymers possess a high temperature stability due to their high glass transition temperatures, good mechanical and also good physical properties. Glass transition temperatures are even unexpectedly higher, when curing is carried out in the presence of organic poly acids. Depending on the selection of monomers, even a reduced combustibility can be achieved.

DETAILED DESCRIPTION OF THE INVENTION

A first object of the invention is a thermosetting composition comprising,
(a) 97.9 to 40 percent by weight of at least one bis(dihydrobenzoxazine) prepared by the reaction of an unsubstituted or substituted bisphenol with at least one unsubstituted position ortho to each hydroxyl group, formaldehyde and a primary amine;
(b) 2 to 50 percent by weight of at least one organic polyamine; and
(c) 0.1 to 10 percent by weight of at least one curing catalyst, selected from the group of carboxylic acids, sulfonic acids and phosphonic acids having at least two acid groups and no other reactive groups;
wherein the percent by weight refer to the total amount of components (a), (b) and (c) in the composition, with the proviso that (a), (b) and (c) add up to 100 percent by weight; and (d) and optionally other components.

The term "no other reactive groups" means that only carboxylic, sulfonic or phosphonic acid groups are present in the acid and no other groups which would interfere with the polymerisation reaction. Examples for such interfering groups are hydroxyl, thiol, amine or amide. In the context of this invention, the term amine (in polyamine) encompasses reactive amines such as secondary or preferably primary amine groups.

In a first preferred embodiment the composition according to the invention comprises
(a) 96.5 to 50, preferably 96.5 to 60 and more preferably 96 to 70 percent by weight of at least one bis(dihydrobenzoxazine),
(b) 3 to 42, preferably 3 to 34 and more preferably 3.5 to 25 percent by weight of at least one organic polyamine; and
(c) 0.5 to 8, preferably 0.5 to 6 and more preferably 0.5 to 5 percent by weight of a curing catalyst, selected from the group of carboxylic acids, sulfonic acids and phosphonic acids having at least two acid groups and no other reactive groups.

It was found that cured resins with a lower content of aromatic polyamines possess higher glass transition temperatures and thermostability, respectively. Such thermosetting compositions in addition are highly reactive at elevated temperatures. Therefore, in another preferred embodiment, the composition according to the invention comprises (a) 97.9 to 80, preferably 97 to 83 and more preferably 96.5 to 85 percent by weight of at least one bis(dihydrobenzoxazine);
(b) 2 to 15, preferably 2.5 to 12 and more preferably 3 to 10 percent by weight of at least one organic polyamine; and
(c) 0.1 to 5 preferably 0.5 to 5 and more preferably 0.5 to 5 percent by weight of a curing catalyst, selected from the group of carboxylic acids, sulfonic acids and phosphonic acids having at least two acid groups and no other reactive groups.

The composition according to the invention is cured at high temperatures such as above 130° C. Curing catalysts are useful to accelerate the curing process. These are preferably incorporated at low levels to avoid formation of volatile decomposition products which would effect the properties of the thermosetting plastics. In a very preferred embodiment, the amount of curing catalyst is 0.5 to 4 percent by weight.

Preferred curing catalysts are aliphatic or aromatic polycarboxylic acids, polysulfonic acids and polyphosphonic acids, having 1 to 20, and preferably 2 to 12 carbon atoms in the skeleton. The aliphatic and aromatic residues (the skeleton) linking the acid groups may contain hetero atoms and groups such as O, S, —N═, C═O, and —N($C_1$-$C_4$alkyl). The aliphatic and aromatic residues may be unsubstituted or substituted with one or more $C_1$-$C_6$alkoxy groups or halogen (F or Cl). The acids may contain preferably 1 to 4 and more preferably 1 or 2 carboxylic, sulfonic or phosphonic acid groups. The aliphatic or aromatic residue can be selected from alkanes, alkenes, cycloalkanes, heterocycloalkanes, cycloalkenes, heterocycloalkenes, carbocyclic or heterocyclic aromatic compounds, such as $C_1$-$C_{18}$alkylene, $C_1$-$C_{18}$alkenylene, $C_3$-$C_{12}$cycloalkylene, $C_3$-$C_{12}$heterocycloalkylene, $C_6$-$C_{18}$arylene, $C_6$-$C_{18}$heteroarylene. A preferred group of acids is selected from those of formulae $Y_1$—$C_nH_{2n}$—$Y_1$, $Y_1$—$C_nH_{2n-2}$—$Y_1$ and $Y_1$—$C_8$-$C_{10}$arylen-$Y_1$, wherein $Y_1$ is selected from the groups —COOH, —SO$_3$H or —PO$_3$H$_2$ and n is a number of 1 to 12, preferably 1 to 6.

Some preferred examples for carboxylic acids are fumaric acid, maleic acid, succinic acid, nonyl- or dodecyl-succinic acid, glutaric acid, adipic acid, pimelic acid, suberic acid, azelaic acid, cyclohexane-1,4-dicarboxylic acid, phthalic acid, isophthalic acid, terephthalic acid and naphthalene dicarboxylic acid. Other examples are methylene disulfonic acid, ethylene disulfonic acid, benzene-1,4-disulfonic acid, methylene diphosphonic acid, ethylene diphosphonic acid and benzene-1,4-diphosphonic acid.

Bis(dihydrobenzoxazines) on the basis of bisphenols are well known, commercially available and can be prepared according to well known and published methods. Bis(dihydrobenzoxazines) on the basis of bisphenols may correspond to formula I,

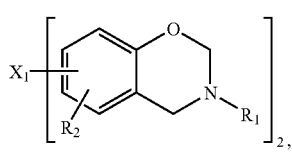
(I)

wherein $R_1$ is $C_1$-$C_{18}$alkyl, or $C_3$-$C_{12}$cycloalkyl, $C_3$-$C_{12}$cycloalkyl-$C_1$-$C_4$alkyl, $C_8$-$C_{18}$aryl or $C_6$-$C_{18}$aryl-$C_1$-$C_4$alkyl, which are unsubstituted or substituted by one or more $C_1$-$C_8$alkyl groups or $C_1$-$C_6$alkoxy groups;

$R_2$ hydrogen, dialkylamino; alkylthio; alkylsulfonyl; $C_1$-$C_{18}$alkyl; $C_1$-$C_{18}$alkoxy; $C_1$-$C_{18}$alkoxyalkyl; $C_5$-$C_{12}$cycloalkyl that is unsubstituted or substituted by one or more $C_1$-$C_6$alkyl groups or $C_1$-$C_1$alkoxy groups; $C_6$-$C_{12}$aryl that is unsubstituted or substituted by one or more $C_1$-$C_6$alkyl groups or $C_1$-$C_6$alkoxy groups; or $C_7$-$C_{13}$aralkyl that is unsubstituted or substituted by one or more $C_1$-$C_6$alkyl groups or $C_1$-$C_6$alkoxy groups;

$X_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, $C_1$-$C_{18}$alkylen, $C_2$-$C_{18}$alkyliden, $C_3$-$C_{12}$cycloalkylen, $C_3$-$C_{12}$cycloalkyliden, —Si(OR$_3$)$_2$— and —Si(R$_3$)$_2$—; and $R_3$ is H or Cl$_1$-$C_{12}$alkyl, $C_5$- or $C_6$-cycloalkyl, $C_5$- or $C_6$-cycloalkyl-methyl or -ethyl, phenyl, benzyl or 1-phenyleth-2-yl.

When the radicals $R_1$ to $R_3$ are alkyl, alkoxy or alkoxyalkyl, those alkoyl or alkoxy radicals can be straight-chained or branched and may contain 1 to 12, more preferably 1 to 8 and most preferable 1 to 4 C atoms.

Examples of alkyl groups are methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl and octadecyl groups.

Suitable alkoxy groups are, for example, methoxy, ethoxy, isopropoxy, n-propoxy, n-butoxy, isobutoxy, sec-butoxy, tert-butoxy and the various isomeric pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy and octadecyloxy groups.

Examples of alkoxyalkyl groups are 2-methoxyethyl, 2-ethoxyethyl, 2-methoxypropyl, 3-methoxypropyl, 4-methoxybutyl and 4-ethoxybutyl.

Cycloalkyl is preferably $C_5$-$C_8$cycloalkyl, especially $C_5$- or $C_6$-cycloalkyl. Some examples thereof are cyclopentyl, methylcyclopentyl, cyclohexyl, cycloheptyl and cyclooctyl.

Aryl groups are, for example, phenyl, naphthyl and anthryl.

Aralkyl preferably contains from 7 to 12 carbon atoms and especially from 7 to 11 carbon atoms. It may be, for example, benzyl, phenethyl, 3-phenylpropyl, α-methylbenzyl, 4-phenylbutyl or α,α-dimethylbenzyl.

$R_1$ is preferably $C_1$-$C_{12}$alkyl, $C_5$-$C_8$cycloalkyl or $C_5$-$C_8$cycloalkyl-$C_1$-$C_2$alkyl that is unsubstituted or substituted by one or more $C_1$-$C_4$alkyl groups or $C_1$-$C_4$alkoxy groups, $C_6$-$C_{10}$aryl or $C_8$-$C_{10}$aryl-$C_1$-$C_2$alkyl that is unsubstituted or substituted by one or more $C_1$-$C_4$alkyl groups or $C_1$-$C_4$alkoxy groups.

$R_1$ is more preferably $C_1$-$C_6$alkyl, or phenyl or benzyl that is unsubstituted or substituted by one or more methyl groups or methoxy groups.

According to the invention, compounds of formula I in which $R_1$ is isopropyl, iso- or tertiary-butyl, n-pentyl or phenyl, are most preferred.

$R_2$ in the compounds of formula I is preferably hydrogen.

Cycloalkylen $X_1$ may be a polycycloalkylen having 2 to 4 condensed and/or bridged carbon cycles such as bicyclo-[2,2,1]-heptanylene or tricyclo-[2,1,0]-decanylene.

$X_1$ is preferably a direct bond or more preferably a bivalent bridging group selected from —O—, —S—, —S(O)—, —S(O)$_2$—, —C(O)—, —P(O)(OR$_3$)O—, —OP(OR$_3$)O—, —OP(OR$_3$)—, —P(OR$_3$)—, —P(R$_3$)—, $C_1$-$C_2$alkylen, and $C_1$-$C_{12}$alkyliden, wherein $R_3$ $C_1$-$C_4$alkyl, $C_5$- or $C_6$-cycloalkyl, phenyl or benzyl.

It was found that S and P containing bridging groups improve flammability resistance and these groups may be selected if said resistance is desired.

$R_3$ is preferably H, $C_1$-$C_{12}$alkyl, $C_5$- or $C_6$-cycloalkyl, $C_5$- or $C_6$-cycloalkyl-methyl or -ethyl, phenyl, benzyl or 1-phenyleth-2-yl. If $R_3$ is part of the groups —P(O)(OR$_3$)O—, —OP(OR$_3$)O—, —OP(OR$_3$)—, —P(OR$_3$)— and —P(R$_3$), then it is preferably not hydrogen.

$R_3$ is more preferably, $C_1$-$C_4$alkyl, cyclohexyl, phenyl or benzyl.

Some especially preferred examples for selected bisphenols used to prepare bis(dihydrobenzoxazines) are 4,4'-biphenol, (4-hydroxyphenyl)$_2$C(O) (DHBP), (4-hydroxyphenyl)ether, (4-hydroxyphenyl)thioether, bisphenol A, bisphenol AP, bisphenol E, bisphenol H, bisphenol F, bisphenol S, bisphenol Z, phenolphthalein and bi(4-hydroxyphenyl) tricyclo-[2,1,0]-decan.

The organic polyamines comprise secondary amine groups or preferably primary amine groups —NH$_2$ or a mixture of these. Secondary amine groups may comprise —NH-groups, which are a ring member replacing a —CH$_2$-group of a carbon ring. Secondary amine groups may also comprise —NR-groups, wherein R is a hydrocarbon residue having 1 to 8, preferably 1 to 6 and in particular 1 to 4 carbon atoms, such as methyl, ethyl, propyl, butyl, cyclohexyl and phenyl. The organic polyamines may comprise 2 to 4, preferably 2 or 3 and most preferably 2 primary and/or secondary amine groups.

The skeleton of the organic polyamines may comprise an aliphatic, cycloaliphatic, aromatic, aromatic-aliphatic, heteroaromatic or heteroaromatic-aliphatic residue having from 2 to 50, preferably 2 to 30, and more preferably 2 to 20 carbon atoms and additionally one or more hetero atoms selected from the group of —O—, —S—, —N═ or —NR—, wherein R is a hydrocarbon residue having 1 to 8 carbon atoms. The skeleton may un-substituted or substituted with one or more $C_1$-$C_6$alkyl groups, $C_1$-$C_6$alkoxy groups, $C_1$-$C_6$alkylthio groups, $C_1$-$C_6$fluoroalkyl groups, —CN, or halogen (F or Cl).

The aliphatic residue may be linear or branched alkylene, alktriyl or alktetryl having 2 to 30 carbon atoms and optionally being interrupted by one or more hetero atoms —O— or —NR—, wherein R is a hydrocarbon residue having 1 to 8 carbon atoms, preferably $C_1$-$C_4$alkyl. Linear or branched alkylene is preferably $C_2$-$C_{18}$alkylene, such as ethylene, 1,2- or 1,3-propylene, 1,2-, 1,3-, 2,3- and 1,4-butylene, 1,2-, 1,3-, 1,4-, 1,5-, 2,3- and 2,4-pentylene, 1,2-, 1,3-, 1,4-, 1,5-, 1,6-, 2,3-, 2,4-, 2,5- and 3,4-hexylene, and the isomers of heptylene, octylene, nonylene, decylene, undecylene, dodecylene, tetradecylene, hexadecylene, octadecylene and eicosylene. Examples for alkylene interrupted by one or more hetero atom(s) (groups) —NR— are N'-methyltriethylene triamine and N'',N'''-dimethyltetraethylene tetramine. Examples for alkylene interrupted by one or more hetero atoms —O— are bis(aminoalkyl)ethers of alkylene diols or polyoxaalkylene diols, which may comprise 2 to 50, preferably 2 to 30, and mostly preferred 2 to 20 identical or different oxaalkylene units, such as polyoxaethylene diols, polyoxa-1,2-propylene diols, polyoxa-1,4-butylene diols or mixed oxaethylene and oxapropylene diols. Bis(aminoalkyl)ethers of polyoxaalkylene diols, also designated as polyoxaalkylene-diamines, are known and are commercially available as Jeffamines®. The aminoalkyl group may be selected from aminoethyl, amino-1,2-propyl and amino-1,3-propyl.

A cycloaliphatic skeleton may be selected from carbon rings or carbon heteroatom rings (hereinafter named heterocyclic skeleton), whereby the hetero atoms may be selected from the group of —O—, —S—, —N═ or —NR—, wherein R is a hydrocarbon residue having 1 to 8 carbon atoms. The rings may comprise 5 to 12, preferably 5 to 8 and especially preferred 5 or 6 ring members. Amino groups may be bonded directly or via a linking group such as methylene or ethylene to the ring. Secondary amino —NH— may be part of the ring. The cycloaliphatic skeleton may comprise condensed cycloaliphatic and/or heterocyclic rings, or such rings linked together optionally via a linking group such as —O—, —S—, —S(O)—, S(O)$_2$—, —C(O)—, methylene, ethylene, $C_2$-$C_6$alkylidene or $C_5$-$C_8$cycloalkylidene. Some examples for polyamines with cycloaliphatic and heterocyclic skeletons are 1,3-diamino-cyclopentane, 1,4-diamino-cyclohexane, isophorone diamine, 4-aminopiperidine, piperazine, 4,4'-diamino-biscyclohexane, 4,4'-diamino-dicyclohexylmethane, 2,2'-dimethyl-4,4'-diamino-dicyclohexylmethane, 4,4'-diamino-biscyclohexanesulfon and 1,4-bis(aminomethyl)cyclohexane.

Aromatic and heteroaromatic skeletons may comprise $C_6$-$C_{20}$arene or $C_3$-$C_{16}$heteroarene, whereby the hetero atoms may be selected from the group of —O—, —S—, —N═ or —NR—, wherein R is hydrogen or a hydrocarbon residue having 1 to 8 carbon atoms. The skeletons may comprise condensed ring systems or two rings linked together optionally via a linking group such as —O—, —S—, —S(O)—, S(O)$_2$—, —C(O)—, methylene, ethylene, $C_2$-$C_6$alkylidene or $C_5$-$C_8$cycloalkylidene. Some examples for polyamines with aromatic and heteroaromatic skeletons are benzene-1,4-diamine, naphthaline-2,7-diamine, 3-amino-pyrrol, amino-indol, 1,4-diamino-benzofuran or -thiophen.

In the context of this invention, aromatic-aliphatic and heteroaromatic-aliphatic skeltons are aromatic and heteroaromatic residues substituted by alkylene groups such as methylene or ethylene, to which amino groups are bonded to form polyamines. Some examples for polyamines with aromatic-aliphatic and heteroaromatic-aliphatic skeletons are 1-amino-2-aminomethyl-benzene, 1-amino-3-aminomethyl-benzene, 1-amino-4-aminomethyl-benzene, 1-amino-4-aminoethyl-benzene, xylylene-diamine, 3-aminomethyl-pyrrol, 3-aminoethyl-pyrrol, and 4,4'-diaminomethyl-biphenyl.

The aromatic polyamine skeleton is preferred and may comprise 6 to 20 carbon atoms and this skeleton may be unsubstituted or substituted with 1 to 4 $C_1$-$C_4$alkyl and/or $C_1$-$C_4$alkoxy. The aromatic polyamine may contain 2 to 4 and more preferably 2 primary amine groups. In a preferred embodiment, the aromatic polyamines comprise benzene-1,4-diamine, naphthalin-diamine or bisphenyl diamines. The bisphenyldiamines preferably correspond to formula II,

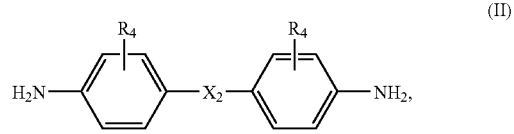

wherein

R$_4$ is hydrogen, C$_1$-C$_4$alkyl or C$_1$-C$_4$alkoxy;

X$_2$ is a direct bond or a bivalent bridging group selected from —O—, —S—, —S(O)—, —S(O)$_2$—, —C(O)—, —NR$_3$—, C$_1$-C$_{18}$alkylen, C$_2$-C$_{18}$alkyliden and C$_3$-C$_{12}$cycloalkyliden; and R$_3$ is H or C$_1$-C$_{12}$alkyl, C$_5$- or C$_6$-cycloalkyl, C$_5$- or C$_6$-cycloalkyl-methyl or -ethyl, phenyl, benzyl or 1-phenyleth-2-yl.

R$_3$ in formula II may independently have the same preferred meanings as R$_3$ in formula I.

In a preferred embodiment, R$_4$ is hydrogen and X$_2$ is a direct bond, —CH$_2$—, —(CH$_2$)$_2$—, cyclohexylidene, —CH(CH$_3$)—, —C(CH$_3$)$_2$—, —O—, —S—, —S(O)—, —S(O)$_2$— or —C(O)—.

Preferred diamines of formula II are (4-aminophenyl)$_2$C(O), 4,4'-diamino-diphenyl, 4,4'-diamino-diphenylether, 4,4'-diamino-diphenylthioether, 4,4'-diamino-diphenylsulfoxide, 4,4'-diamino-diphenylsulfone, 4,4'-diamino-diphenyl-methane, 4,4'-diamino-diphenyl-1,2-ethane, 4,4'-diamino-diphenyl-ethylidene, 4,4'-diamino-diphenyl-2,2-proylidene, and 4,4'-diamino-diphenyl-2,2-cyclohexylidene. Diamines with sulfur containing bridging groups may be selected if improvement of high flammability resistance is desired.

In another preferred embodiment the organic polyamine is selected from primary diamines of C$_5$-C$_8$cycloalkanes or primary diamines of C$_5$-C$_8$cycloalkanes linked together optionally via a linking group, such as —S(O)$_2$—, —C(O)—, methylene, ethylene, C$_2$-C$_6$alkylidene or C$_5$-C$_8$cycloalkylidene.

In a further preferred embodiment the organic polyamine is selected from primary diamines of polyoxaalkylenes (Jeffamines®).

The aromatic polyamines may be used alone or in admixture with aromatic dihydroxy compounds. Aromatic dihydroxy compounds may comprise an aromatic skeleton having 6 to 20 carbon atoms and this skeleton may be unsubstituted or substituted with 1 to 4 C$_1$-C$_4$alkyl and/or C$_1$-C$_4$alkoxy. In a preferred embodiment, the aromatic dihydroxy compound is selected from hydrochinone, resorcinol, catechol, or from bisphenols of formula III,

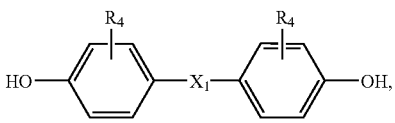

(III)

wherein

R$_4$ is hydrogen, C$_1$-C$_4$alkyl or C$_1$-C$_4$alkoxy;

X$_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, C$_1$-C$_{18}$alkylen, C$_2$-C$_{18}$alkyliden, C$_3$-C$_{12}$cycloalkyliden, —Si(OR$_3$)$_2$— and —Si(R$_3$)$_2$—; and R$_3$ is H or C$_1$-C$_{12}$alkyl, C$_5$- or C$_6$-cycloalkyl, C$_5$- or C$_6$-cycloalkyl-methyl or -ethyl, phenyl, benzyl or 1-phenyleth-2-yl.

R$_3$ in formula III may independently have the same preferred meanings as R$_3$ in formula I. R$_4$ is in particular hydrogen or C$_1$-C$_4$alkyl, such as methyl or ethyl.

X$_1$ in formula III preferably is a direct bond or a bivalent bridging group selected from —O—, —S—, —S(O)$_2$—, —C(O)—, —NR$_3$, C$_1$-C$_4$alkylen (for example methylene or 1,2-ethylene), C$_2$-C$_6$alkyliden (for example ethyliden, 1,1- or 2,2-propyliden, 1,1- or 2,2-butyliden, 1,1-, 2,2- or 3,3-pentyliden, or 1,1-, 2,2- or 3,3-hexyliden) or C$_5$-C$_8$cycloalkyliden (cyclopentyliden, cyclohexyliden or cyclooctyliden), whereby R$_3$ is preferably hydrogen or C$_1$-C$_4$alkyl.

If improved flammability resistance is desired, X$_1$ in formula III is a bivalent bridging group selected from —S—, and —S(O)$_2$—.

Preferred bisphenols of formula III are 4,4'-biphenol, (4-hydroxyphenyl)$_2$C(O) (DHBP), (4-hydroxyphenyl)ether, (4-hydroxyphenyl)thioether, bisphenol A, bisphenol AP, bisphenol E, bisphenol H, bisphenol F, bisphenol S and bisphenol Z. Bisphenols with sulfur containing bridging groups may be selected if improvement of high flammability resistance is desired.

The weight ratio of organic polyamines and aromatic dihydroxy compounds may be from 99:1 to 1:99, preferably 95:1 to 1:95 and more preferably 90:1 to 1:90.

The properties of the thermosetting resins can be tailored for certain applications by addition of usual additives. The following additives are of particular importance:

reinforcement fibers, such as glass, quartz, carbon, mineral and synthetic fibers (Keflar, Nomex), natural fibres, such as flax, jute, sisal, hemp in the usual forms of short fibers, staple fibers, threads, fabrics or mats;

plasticizers, especially phosphorus compounds;

mineral fillers, such as oxides, carbides, nitrides, silicates and salts, e.g. quartz powder, fused silica, aluminium oxide, glass powder, mica, kaolin, dolomite, carbon black or graphite;

pigments and dyestuffs;

micro hollow spheres;

metal powders;

flame retardants;

defoaming agents;

slip agents;

thixotropes;

adhesion promoters; and mould release agents.

The thermosetting composition according to the invention can also comprise a solvent or a solvent mixture, especially when it is used as laminating or surface coating composition. Examples of solvents that are particularly suitable include methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycols, glycol acetates and toluene, xylene. The ketones and the glycols are especially preferred. Typically, the laminating composition will contain 20 to 30% by weight, preferably 30% by weight, of a solvent.

The thermosetting composition according to the invention can be cured or pre-cured at temperatures of about 130 to 240° C., preferably 150 to 220° C. and in particular 160 to 200° C. for the manufacture of prepregs, laminates or hot melting moulding processes.

The thermosetting composition according to the invention can be used for example for the manufacture of composites from prepregs or B stage resins, and RTM (resin transfer moulding) systems.

The thermosetting compositions according to the invention can be used for example as solvent-free casting resins, surface coating resins, laminating resins, moulding resins, potting resins, encapsulating resins and adhesives to produce moulded or coated articles or composites for the electrical and electronic, automotive and aerospace industry, or for surface protection of any articles, e.g. pipes and pipelines.

Curing of the composition and an impregnation and lamination process is explained in the following:

(1) A benzoxazin-containing formulation is applied to or impregnated into a substrate by rolling, dipping, spraying, other known techniques and/or combinations thereof. The substrate is typically a woven or nonwoven fiber mat containing, for instance, glass fibers, carbon or mineral fibers or paper.

(2) The impregnated substrate is "B-staged" by heating at a temperature sufficient to evaporate solvent (if present) from the benzoxazin formulation and to partially cure the benzoxazin formulation, so that the impregnated substrate can be handled easily. The "B-staging" step is usually carried out at a temperature of from 80° C. to 220° C. and for a time of from 1 minute to 15 minutes. The impregnated substrate that results from "B-staging" is called a "prepreg". The temperature is most commonly 100° C. for composites and 130° C. to 200° C. for electrical laminates.

(3) One or more sheets of prepreg are stacked on top of each other; this can be in alternating layers with one or more sheets of a conductive material, such as copper foil, if an electrical laminate is desired.

(4) The laid-upsheets are pressed at high temperature and pressure for a time sufficient to cure the resin and form a laminate. The temperature of this lamination step is usually between 100° C. and 240° C., and is most often between 165° C. and 190° C. The lamination step may also be carried out in two or more stages, such as a first stage between 100° C. and 150° C. and a second stage at between 165° C. and 190° C. The pressure is usually from 50 N/cm² and 500 N/cm². The lamination step is usually carried out for a time of from 1 minute to 200 minutes, and most often for 45 minutes to 90 minutes. The lamination step may optionally be carried out at higher temperatures for shorter times (such as in continuous lamination processes) or for longer times at lower temperatures (such as in low energy press processes).

(5) Optionally, the resulting laminate, for example, a copper-clad laminate, may be post-treated by heating for a time at high temperature and ambient pressure. The temperature of post-treatment is usually between 120° C. and 250° C. The post-treatment time usually is between 30 minutes and 12 hours.

Solid substrates for coating purposes may be selected from metal, metal alloys, wood, glass, minerals such as silicates, corundum or boron nitride, and plastics.

The cured resins possess a high chemical resistance, corrosion resistance, mechanical resistance, durability, hardness, toughness, flexibility, temperature resistance or stability (high glass transition temperatures), reduced combustibility, adhesion to substrates and de-lamination resistance.

Another object is the use of a thermosetting composition according to the invention for the manufacture of a moulded article, a surface coating, a composite and a laminate.

A further object of the invention are cured products manufactured from the thermosetting composition according to the invention.

EXAMPLES

The following examples explain the invention.
A) Preparation of Thermosetting Compositions Example A1

A solid mixture (parts by weight) of benzoxazine, aromatic diamine and adipic acid is molten at 130-140° C. under thorough stirring. The gel time of such homogenous mixture is measured on a hot plate at 180° C. The mixture is cured in an oven at 200° C. for 90 minutes. The results are given in Table 1.

Bisphenol F benzoxazine corresponds to formula

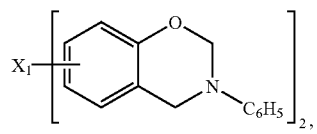

wherein $X_1$ is —$CH_2$—.

TABLE 1

|  | Comparison | A1 |
| --- | --- | --- |
| bisphenol F benzoxazine | 10 | 10 |
| 4,4'-diamino-diphenylsulfone | 0.38 | 0.38 |
| adipic acid | — | 0.38 |
| gel time/180° C. (sec) | 1166 | 180 |
| DSC 30-350 ° C., 20° C./min |  |  |
| onset (° C.) | 225 | 179 |
| T peak (° C.) | 243 | 203 |
| Enthalpie (J/g) | 215 | 274 |
| $T_g$ after 90 min/200° C. | 166 | 179 |

Example A2

Example A1 is repeated and 2,2'-dimethyl-4,4'-diamino-dicyclohexylmethane is used instead of 4,4'-diamino-diphenylsulfone. Curing is carried out additionally for 1 hour at 200° C. and 2 hours at 220° C. The results are given in Table 2.

TABLE 2

|  | Comparison | A2 |
| --- | --- | --- |
| bisphenol F benzoxazine | 5 | 5 |
| 2,2'-dimethyl-4,4'-diamino-dicyclohexylmethane | 0.6 | 0.6 |
| adipic acid | — | 0.2 |
| gel time/180° C. (sec) | 562 | 76 |
| DSC 30-350° C., 20° C./min |  |  |
| onset (° C.) | 198 | 173 |
| T peak (° C.) | 233 | 220 |
| Enthalpie (J/g) | 192 | 192 |
| $T_g$ after 90 min/200° C. | 150 | 166 |
| $T_g$ after 1 h/200° C. + 2 h/220° C. | 163 | 172 |

Example A3

Example A1 is repeated and polyoxypropylene diamine (Jeffamine) is used instead of 4,4'-diamino-diphenylsulfone. The gel time of such homogenous mixture is measured on a hot plate at 170° C. Curing is carried out additionally for 1 hour at 200° C. and 2 hours at 220° C. The results are given in Table 3.

TABLE 3

|  | Comparison | A3 |
|---|---|---|
| bisphenol F benzoxazine | 3.5 | 3.5 |
| polyoxypropylene diamine | 0.6 | 0.6 |
| adipic acid | — | 0.2 |
| gel time/170° C. (sec) | 180 | 70 |
| DSC 30-350° C., 20° C./min |  |  |
| onset (° C.) | 160 | 137 |
| T peak (° C.) | 213 | 194 |
| Enthalpie (J/g) | 136 | 82 |
| $T_g$ after 90 min/200° C. | 142 | 145 |
| $T_g$ after 1 h/200° C. + 2 h/220° C. | 158 | 173 |

Remarks: The enhanced reaction (shorter gel time) rate, when adipic acidic is used as curing catalyst, results in a much shorter gel time. The cured samples show a very high glass transition temperature.

The invention claimed is:

1. A thermosetting composition comprising:
(a) 97.9 to 40 percent by weight of at least one bis(dihydrobenzoxazine) prepared by the reaction of an unsubstituted or substituted bisphenol with at least one unsubstituted position ortho to each hydroxyl group, formaldehyde and a primary amine;
(b) 2 to 50 percent by weight of at least one organic polyamine; and
(c) 0.1 to 10 percent by weight of at least one curing catalyst, selected from the group of carboxylic acids, sulfonic acids and phosphonic acids having at least two acid groups and no other reactive groups and wherein the catalyst corresponds to compounds of formulae $Y_1—C_nH_{2n}—Y_1$, $Y_1—C_nH_{2n-2}—Y_1$ and $Y_1—C_6—C_{10}$ arylen-$Y_1$, wherein $Y_1$ is selected from the groups —COOH, —$SO_3H$ and —$PO_3H_2$ and n is a number from 1 to 12;

and wherein the percent by weight refer to the total amount of components (a), (b) and (c) in the composition, with the proviso that (a), (b) and (c) add up to 100 percent by weight; and
(d) and optionally other components.

2. A thermosetting composition according to claim 1, which comprises
(a) 96.5 to 50 percent by weight of at least one bis(dihydrobenzoxazine),
(b) 3 to 42 percent by weight of at least one organic polyamine; and
(c) 0.5 to 8 percent by weight of a curing catalyst, selected from the group of carboxylic acids, sulfonic acids and phosphonic acids having at least two acid groups and no other reactive groups.

3. A thermosetting composition according to claim 1, which comprises
(a) 97.9 to 80 percent by weight of at least one bis(dihydrobenzoxazine);
(b) 2 to 15 percent by weight of at least one organic polyamine; and
(c) 0.1 to 5 percent by weight of a curing catalyst, selected from the group of carboxylic acids, sulfonic acids and phosphonic acids having at least two acid groups and no other reactive groups.

4. A thermosetting composition according to claim 1, which comprises as component (a) bis(dihydrobenzoxazines) of formula I,

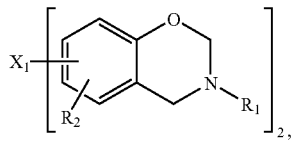

(I)

wherein
$R_1$ is $C_1$-$C_{18}$ alkyl, or $C_3$-$C_{12}$ cycloalkyl, $C_3$-$C_{12}$ cycloalkyl-$C_1$-$C_4$ alkyl, $C_6$-$C_{18}$ aryl or $C_6$-$C_{18}$ aryl-$C_1$-$C_4$ alkyl, which are unsubstituted or substituted by one or more $C_1$-$C_6$ alkyl groups or $C_1$-$C_6$ alkoxy groups;
$R_2$ is hydrogen, dialkylamino; alkylthio; alkylsulfonyl; $C_1$-$C_{18}$ alkyl; $C_1$-$C_{18}$ alkoxy; $C_1$-$C_{18}$ alkoxyalkyl; $C_5$-$C_{12}$ cycloalkyl that is unsubstituted or substituted by one or more $C_1$-$C_6$ alkyl groups or $C_1$-$C_6$ alkoxy groups; $C_6$-$C_{12}$ aryl that is unsubstituted or substituted by one or more $C_1$-$C_6$ alkyl groups or $C_1$-$C_6$ alkoxy groups; or $C_7$-$C_{13}$ aralkyl that is unsubstituted or substituted by one or more $C_1$-$C_6$ alkyl groups or $C_1$-$C_6$ alkoxy groups;
$X_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, $C_1$-$C_{18}$ alkylen, $C_2$-$C_{18}$ alkyliden, $C_3$-$C_{12}$ cycloalkylen, $C_3$-$C_{12}$ cycloalkyliden, —Si(OR$_3$)$_2$— and —Si(R$_3$)$_2$—; and
$R_3$ is H or $C_1$-$C_{12}$ alkyl, $C_5$- or $C_6$-cycloalkyl, $C_5$- or $C_6$-cycloalkyl-methyl or -ethyl, phenyl, benzyl or 1-phenyleth-2-yl.

5. A thermosetting composition according to claim 4, wherein $R_1$ is $C_1$-$C_6$ alkyl, or phenyl or benzyl that is unsubstituted or substituted by one or more methyl groups or methoxy groups.

6. A thermosetting composition according to claim 4, wherein $R_2$ is hydrogen.

7. A thermosetting composition according to claim 4, wherein $X_1$ is a direct bond or a bivalent bridging group selected from —O—, —S—, —S(O)—, —S(O)$_2$—, —C(O)—, —P(O)(OR$_3$)O—, —OP(OR$_3$)O—, —OP(OR$_3$)—, —P(OR$_3$)—, —P(R$_3$)—, $C_1$-$C_2$ alkylene, and $C_1$-$C_{12}$ alkyliden, and wherein $R_3$ is $C_1$-$C_4$ alkyl, $C_5$- or $C_6$-cycloalkyl, phenyl or benzyl.

8. A thermosetting composition according to claim 4, wherein $R_3$ is H, $C_1$-$C_{12}$ alkyl, $C_5$- or $C_6$-cycloalkyl, $C_5$- or $C_6$-cycloalkyl-methyl or -ethyl, phenyl, benzyl or 1-phenyleth-2-yl, with the proviso that if $R_3$ is in the groups —P(O)(OR$_3$)O—, —OP(OR$_3$)O—, —OP(OR$_3$)—, —P(OR$_3$)— and —P(R$_3$)— then it is not hydrogen.

9. A thermosetting composition according to claim 1, wherein the organic polyamine is an aromatic polyamine, which comprises 6 to 20 carbon atoms and is unsubstituted or substituted with 1 to 4 $C_1$-$C_4$ alkyl and/or $C_1$-$C_4$ alkoxy.

10. A thermosetting composition according to claim 1, wherein the aromatic polyamine has 2 to 4 primary amine groups.

11. A thermosetting composition according to claim 9, wherein the aromatic polyamine comprises benzene-1,4-diamine, naphthaline diamine or bisphenyl diamines or any mixture thereof.

12. A thermosetting composition according to claim 11, wherein the bisphenyl diamines correspond to formula II,

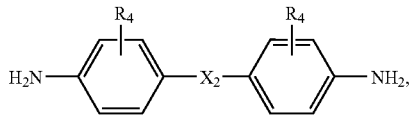

wherein

R$_4$ is hydrogen, C$_1$-C$_4$ alkyl or C$_1$-C$_4$ alkoxy;

X$_2$ is a direct bond or a bivalent bridging group selected from —O—, —S—, —S(O)—, —S(O)$_2$—, —C(O)—, —NR$_3$—, C$_1$-C$_{18}$ alkylen, C$_2$-C$_{18}$ alkyliden and C$_3$-C$_{12}$ cycloalkyliden; and R$_3$ is H or C$_1$-C$_{12}$ alkyl, C$_5$- or C$_6$-cycloalkyl, C$_5$- or C$_6$-cycloalkyl-methyl or -ethyl, phenyl, benzyl or 1-phenyleth-2-yl.

13. A thermosetting composition according to claim 1, wherein the organic polyamine is selected from primary diamines of C$_5$-C$_8$ cycloalkanes and of primary diamines of C$_5$-C$_8$ cycloalkanes linked together directly or via a linking group comprising —S(O)$_2$—, —C(O)—, methylene, ethylene, C$_2$-C$_6$ alkyliden or C$_5$-C$_8$ cycloalkyliden.

14. A thermosetting composition according to claim 1, wherein the organic polyamine is selected from primary diamines of polyoxaalkylenes.

15. A thermosetting composition according to claim 1, additionally comprising aromatic dihydroxy compound, selected from hydrochinone, resorcinol, catechol, and bisphenols of formula III,

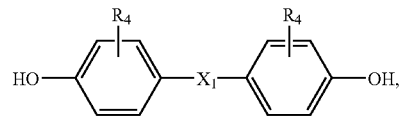

wherein

R$_4$ is hydrogen, C$_1$-C$_4$ alkyl or C$_1$-C$_4$alkoxy;

X$_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, C$_1$-C$_{18}$ alkylen, C$_2$-C$_{18}$alkyliden, C$_3$-C$_{12}$ cycloalkyliden, —Si(OR$_3$)$_2$— and —Si(R$_3$)$_2$—; and R$_3$ is H or C$_1$-C$_{12}$ alkyl, C$_5$- or C$_6$-cycloalkyl, C$_5$-or C$_6$-cycloalkyl-methyl or -ethyl, phenyl, benzyl or 1-phenyleth-2-yl.

16. A thermosetting composition according to claim 15, wherein R$_4$ is hydrogen or C$_1$-C$_4$ alkyl.

17. A thermosetting composition according to claim 15, wherein X$_1$ is a direct bond or a bivalent bridging group selected from —O—, —S—, —S(O)$_2$—, —C(O)—, —NR$_3$, C$_1$-C$_4$ alkylen, C$_2$-C$_6$ alkyliden or C$_5$-C$_8$cycloalkyliden, and wherein R$_3$ is hydrogen or C$_1$-C$_4$ alkyl.

18. A thermosetting composition according to claim 15 wherein the weight ratio of organic polyamines to aromatic dihydroxy compounds ranges from 99:1 to 1:99.

19. A method of forming a laminate comprising:
(a) applying the thermosetting composition of claim 1 to a substrate;
(b) heating the substrate to partially cure the thermosetting composition and form a prepeg;
(c) optionally repeating steps (a) and (b);
(d) stacking one or more sheets of prepeg on top of each other; and
(e) pressing the stacked sheets at a temperature of between 100° C. to 240° C. and a pressure of between 50 N/cm$^2$ to 500 N/cm$^2$ to form the laminate.

20. A method of coating a substrate comprising applying the thermosetting composition of claim 1 to the surface of the substrate.

21. A cured product produced by curing the thermosetting composition of claim 1.

* * * * *